US012553743B2

(12) United States Patent
Lee et al.

(10) Patent No.: US 12,553,743 B2
(45) Date of Patent: Feb. 17, 2026

(54) METHOD AND APPARATUS FOR SHARING MAP CORRECTION DATA

(71) Applicant: 42DOT INC., Seoul (KR)

(72) Inventors: Jin Kwon Lee, Yongin (KR); Jin Yeon Choi, Seoul (KR); Dong Hyun Seo, Seoul (KR); Hyun Woong Lee, Seongnam (KR)

(73) Assignee: 42dot Inc., Seoul (KR)

( * ) Notice: Subject to any disclaimer, the term of this patent is extended or adjusted under 35 U.S.C. 154(b) by 104 days.

(21) Appl. No.: 18/560,083

(22) PCT Filed: May 10, 2022

(86) PCT No.: PCT/KR2022/006604
§ 371 (c)(1),
(2) Date: Nov. 15, 2023

(87) PCT Pub. No.: WO2022/240109
PCT Pub. Date: Nov. 17, 2022

(65) Prior Publication Data
US 2024/0240967 A1    Jul. 18, 2024

(30) Foreign Application Priority Data

May 10, 2021 (KR) .................. 10-2021-0060303
Jul. 15, 2021 (KR) .................. 10-2021-0093061

(51) Int. Cl.
*G01C 21/00* (2006.01)
(52) U.S. Cl.
CPC .................. *G01C 21/3896* (2020.08)
(58) Field of Classification Search
CPC ............ G01C 21/3896; G01C 21/3885; G01C 21/3889; G01C 21/3893
See application file for complete search history.

(56) References Cited

U.S. PATENT DOCUMENTS

| 2006/0173613 A1* | 8/2006 | Iwahori | G01C 21/3896 |
| | | | 701/450 |
| 2012/0316780 A1* | 12/2012 | Huth | G09B 29/10 |
| | | | 701/450 |

(Continued)

FOREIGN PATENT DOCUMENTS

| JP | 2005-011230 A | 1/2005 |
| JP | 2011-041185 A | 2/2011 |

(Continued)

OTHER PUBLICATIONS

International Search Report dated Aug. 26, 2022.
JP Office Action.

*Primary Examiner* — Aaron L Troost
(74) *Attorney, Agent, or Firm* — Harvest IP Law, LLP (57) ABSTRACT

The present disclosure relates to a method and an apparatus for sharing map revision details. A method according to an embodiment of the present disclosure includes receiving, from a first user terminal, first revision details generated based on an initial map and a first revised map revised from the initial map, receiving, from a second user terminal, second revision details generated based on the initial map and a second revised map revised from the initial map, transmitting the second revision details to the first user terminal and transmitting the first revision details to the second user terminal, and according to a result of the transmissions, reflecting in real time the second revision details on the first revised map displayed on the first user terminal and reflecting in real time the first revision details on the second revised map displayed on the second user terminal.

8 Claims, 9 Drawing Sheets

(56) References Cited

U.S. PATENT DOCUMENTS

2017/0054771 A1    2/2017  Shin
2023/0258472 A1*   8/2023  Ashman ............. G01C 21/3804
                                                          701/24

FOREIGN PATENT DOCUMENTS

| JP | 2014-026048 A | | 2/2014 |
|----|---------------|---|--------|
| JP | 2020112754 A | * | 7/2020 |
| KR | 10-0208786 B1 | | 7/1999 |
| KR | 10-0508974 B1 | | 8/2005 |
| KR | 10-0557747 B1 | | 3/2006 |
| KR | 10-2012-0034383 A | | 4/2012 |
| KR | 10-2014-0068321 A | | 6/2014 |
| KR | 10-2016-0046444 A | | 4/2016 |
| KR | 10-2016-0089988 A | | 7/2016 |
| KR | 10-2017-0133169 A | | 12/2017 |
| KR | 10-2018-0052572 A | | 5/2018 |

* cited by examiner

METHOD AND APPARATUS FOR SHARING MAP CORRECTION DATA

CROSS REFERENCE TO RELATED APPLICATION(S)

This application is a National Stage of International Application No. PCT/KR2022/006604 filed on May 10, 2022, claiming priority based on Korean Patent Application No. 10-2021-0060303 filed on May 10, 2021 and 10-2021-0093061 filed on Jul. 15, 2021.

TECHNICAL FIELD

The present disclosure provides a method and an apparatus for sharing map revision data.

BACKGROUND ART

Recently, there has been an increase in works involving generation of map data for navigation devices, etc. or continuous modification of previously generated map data. When modifying previously generated map data, as a plurality of users modify the map data, map revision details made by each of the users may be lost.

Accordingly, for simultaneous modification of map data by multiple users, technologies that enable real-time reflection of map revision details made by multiple users have been required.

DISCLOSURE

Technical Problem

The present disclosure aims to provide a method and an apparatus for sharing map revision data. However, the object of the present disclosure is not limited thereto. Other objects and advantages of the present disclosure which are not mentioned above will be understood from the following description and clarified by embodiments of the present disclosure. In addition, the objects and advantages of the present disclosure may be implemented by the methods described in the claims and combinations thereof.

Technical Solution

As a technical solution to achieve the technical object described above, an aspect of the present disclosure provides a method of sharing map revision details, the method including receiving, from a first user terminal, first revision details generated based on an initial map and a first revised map revised from the initial map, receiving, from a second user terminal, second revision details generated based on the initial map and a second revised map revised from the initial map, transmitting the second revision details to the first user terminal and transmitting the first revision details to the second user terminal, and according to a result of the transmissions, reflecting in real time the second revision details on the first revised map displayed on the first user terminal and reflecting in real time the first revision details on the second revised map displayed on the second user terminal.

A first final map may be generated by reflecting in real time the second revision details on the first revised map displayed on the first user terminal, a second final map may be generated by reflecting in real time the first revision details on the second revised map displayed on the second user terminal, and the first final map displayed on the first user terminal and the second final map displayed on the second user terminal may be synchronized with each other in real time.

The transmitting may include converting the first revision details and the second revision details into a first key value and a second key value, respectively, wherein the first and second key values may respectively correspond to particular character strings, and transmitting the first key value to the second user terminal and transmitting the second key value to the first user terminal.

The transmitting may further include transmitting the first key value to the second user terminal through a first intermediary server communicating with the second user terminal.

The transmitting may further include transmitting the first key value to the first user terminal through a first intermediary server communicating with the first user terminal, and transmitting the first key value to the second user terminal through a second intermediary server which has received the first key value from the first user terminal.

The transmitting may further include comparing a data size of the first revision details with a preset data size, and based on a result of the comparison, transmitting the first key value to the second user terminal when the data size of the first revision details is greater than the preset data size.

The transmitting may further include grouping a plurality of user terminals including the first user terminal into any one of a first user terminal group and a second user terminal group, and determining whether to transmit the first key value to the second user terminal according to which group between the first user terminal group and the second user terminal group the second user terminal is included in.

The transmitting may further include grouping the initial map into any one of a first map group and a second map group according to a type of the initial map, and determining whether to transmit the first key value to the second user terminal according to which group between the first map group and the second map group the initial map is included in.

The transmitting may further include grouping a plurality of intermediary servers including the first intermediary server into any one of a first intermediary server group and a second intermediary server group, and determining whether to transmit the first key value to the second user terminal through the first intermediary server according to which group between the first intermediary server group and the second intermediary server group the first intermediary server is included in.

Advantageous Effects

According to the aforementioned technical solutions of the present disclosure, revision details made by each of users of a plurality of user terminals may be shared in real time. Thus, loss of the revision details made by each user may be prevented. According to the aforementioned technical solutions of the present disclosure, as users of a plurality of user terminals can modify map data in real time, business efficiency may be promoted.

BEST MODE

The present disclosure relates to a method and an apparatus for sharing map revision details. A method according to an embodiment of the present disclosure includes receiving, from a first user terminal, first revision details generated based on an initial map and a first revised map revised from the initial map, receiving, from a second user terminal, second revision details generated based on the initial map and a second revised map revised from the initial map, transmitting the second revision details to the first user terminal and transmitting the first revision details to the second user terminal, and according to a result of the transmissions, reflecting in real time the second revision details on the first revised map displayed on the first user terminal and reflecting in real time the first revision details on the second revised map displayed on the second user terminal.

MODE FOR INVENTION

The effects and features of the present disclosure, as well as the methods to achieve them will become apparent with reference to the below embodiments described in detail along with the drawings. However, the present disclosure is not limited to the embodiments below and may be implemented in various forms. Any modifications, equivalents, or substitutes that do not depart from the spirit and technical scope of the present disclosure are encompassed in the embodiments. The embodiments below are provided so that this disclosure will be thorough and complete, and will fully convey the scope of the present disclosure to one of ordinary skill in the art. In the description of embodiments, certain detailed explanations of the related art are omitted when it is deemed that they may unnecessarily obscure the essence of the present disclosure.

The terms used in the present specification are merely used to describe exemplary embodiments, and are not intended to limit embodiments. An expression used in the singular encompasses the expression of the plural, unless it has a clearly different meaning in the context. Further, the terms such as "include" or "have" in various embodiments of the present disclosure are used to specify the existence of features, numbers, processes, operations, components, parts recited in the detailed description, or combinations thereof, and thus should not be understood as precluding the existence or possibility for addition of one or more other features, numbers, processes, operations, components, parts, or combinations thereof.

Embodiments may be described in terms of functional block components and various processing steps. Such functional blocks may be realized by any number of hardware and/or software components configured to perform specified functions. For example, the functional blocks of the present disclosure may be implemented by one or more microprocessors or by circuit components for certain functions. Furthermore, the functional blocks of the present disclosure may be implemented with various programming or scripting languages. The functional blocks may be implemented by algorithms that are executed on one or more processors. In addition, embodiments could employ any number of conventional techniques for electronics configuration, signal processing and/or control, data processing and the like. The words "mechanism," "element," "means," and "configuration" are used broadly and are not limited to mechanical or physical embodiments.

Moreover, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Figure 1:
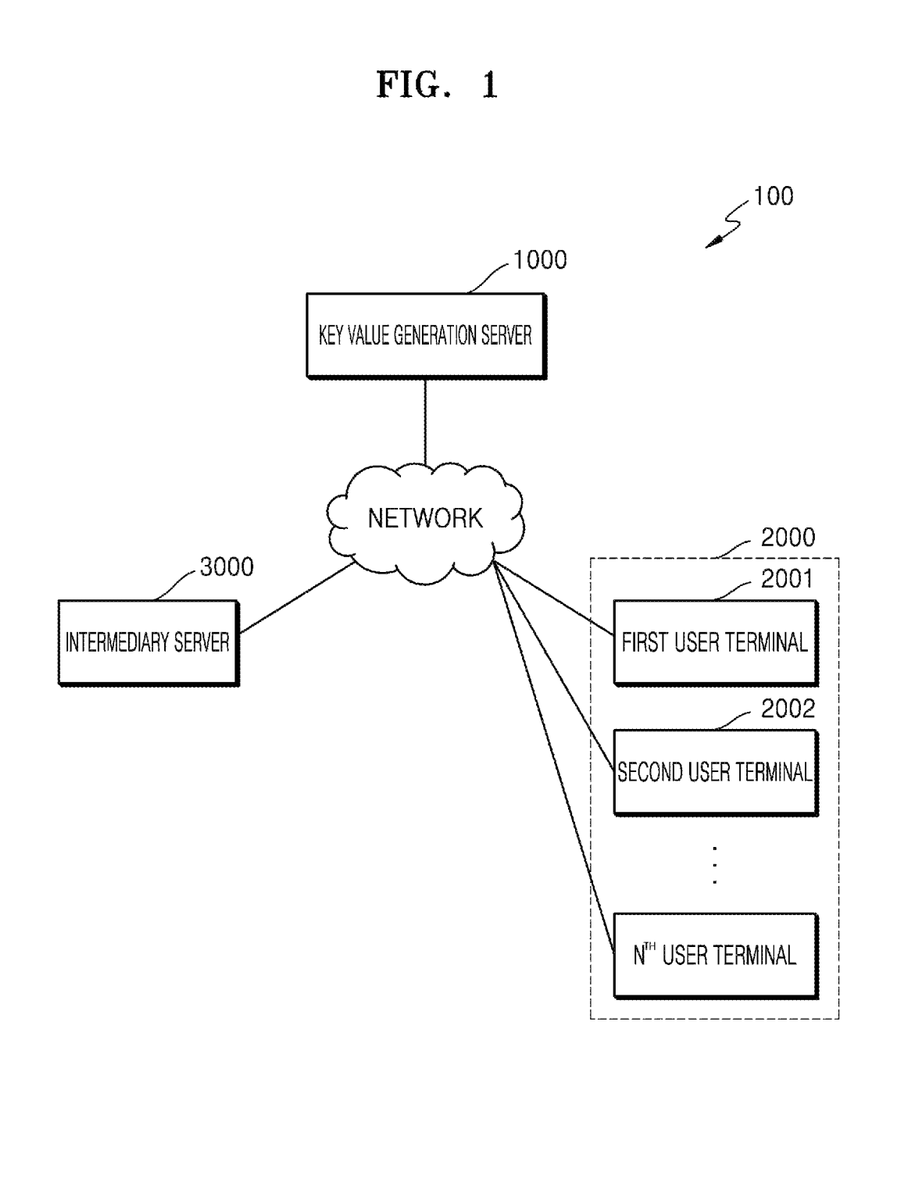
FIG. 1 is a diagram illustrating a system sharing map revision details according to an embodiment.

FIG. 1 is a diagram illustrating a system sharing map revision details according to an embodiment.

A system sharing map revision details 100 according to an embodiment may include a key value generation server 1000, at least one user terminal 2000, and an intermediary server 3000. FIG. 1 illustrates only the components of the system sharing map revision details 100 that are related to an embodiment. It would be obvious to a person skilled in the art that the system sharing map revision details 100 may further include general-purpose components other than the components illustrated in FIG. 1.

In present disclosure, the revision details refer to modifications applied to a map in the process of editing the map through user terminals. The revision details may show differences between an initial map and an edited interim map, differences between an initial map and an edited final map, differences between a first edited interim map and a second edited interim map, or differences between an edited interim map and an edited final map.

In the present disclosure, the revision details may include all modifications which may be made in the process of editing a map. For example, the modifications which may be made during editing of a map may include display, color, opacity, size, rotation, etc. of constituent layers, polygons, objects, icons, characters, etc. in a map.

The system sharing map revision details 100 may be a system in which the key value generation server 1000 shares revision details generated by revising an initial map by a first user of a first user terminal 2001 with at least one user terminal, e.g., a second user terminal 2002, etc. through the intermediary server 3000.

According to an embodiment, the user terminal 2000 may receive an initial map from the key value generation server 1000, and the user terminal 2000 may receive map revision inputs by a user and generate a revised map. The user terminal 2000 may generate revision details based the initial map and the revised map.

According to an embodiment, the key value generation server 1000 may convert the revision details received from the user terminal 2000 into a key value. The key value may be a value obtained by converting, encompassing, or compressing the revision details encoded according to a predetermined rule or method. For example, the key value may be a particular character string consisting of a series of consecutive characters. The key value generation server 1000 may transmit the generated key value to the intermediary server 3000. The key value generation server 1000 may be a database storing the revision details received from the user terminal 2000 or the intermediary server 3000, the initial map, etc.

According to an embodiment, the intermediary server 3000 may transmit the key value received from the key value generation server 1000 to at least one user terminal 2000 communicating with the intermediary server 3000. For example, the intermediary server 3000 may transmit the revision details generated by the first user terminal 2001 to other user terminals connected to the intermediary server 3000 to share the revision details in real time.

When users of a plurality of user terminals revise the initial map simultaneously, multiple revised maps which are different from each other may be generated, and accordingly, revision details generated from each of the user terminals may be lost. Thus, the revision details generated from each of the plurality of user terminals may be shared in real time to prevent loss of the revision details.

According to an embodiment, the key value generation server 1000 may receive from the first user terminal 2001 first revision details generated based on an initial map and a first revised map revised from the initial map and receive from the second user terminal 2002 second revision details generated based on the initial map and a second revised map revised from the initial map. In addition, the key value generation server 1000 may transmit the second revision details to the first user terminal 2001 and transmit the first revision details to the second user terminal 2002 through the intermediary server 3000. Accordingly, the key value generation server 1000 may reflect in real time the second revision details on the first revised map displayed on the first user terminal 2001 and reflect in real time the first revision details on the second revised map displayed on the second user terminal 2002.

Finally, a first final map may be generated by reflecting the second revision details in real time on the first revised map displayed on the first user terminal 2001, and a second final map may be generated by reflecting the first revision details in real time on the second revised map displayed on the second user terminal 2002. In this regard, the first final map displayed on the first user terminal 2001 and the second final map displayed on the second user terminal 2002 may be synchronized with each other in real time.

The key value generation server 1000, the at least one user terminal 2000, and the intermediary server 3000 may perform communication among each other by using a network. For example, the network may include a local area network (LAN), a wide area network (WAN), a value-added network (VAN), a mobile radio communication network, a satellite communication network, or a combination thereof, and may refer to a comprehensive data network facilitating communication among constituents of network illustrated in FIG. 1, e.g., a wired internet, a wireless internet, or a mobile wireless communication network. Moreover, the wireless communication may include, for example, Wi-Fi, Bluetooth, Bluetooth low energy, Zigbee, Wi-Fi Direct (WFD), ultra wideband (UWB), infrared data association (IrDA), near field communication (NFC), etc.; however, the present disclosure is not limited thereto.

For example, the user terminal 2000 may be a smartphone, a tablet personal computer (PC), a PC, a smart television (TV), a mobile phone, a personal digital assistant (PDA), a laptop, a media player, a micro server, a global positioning system (GPS) device, an electronic book terminal, a digital broadcasting terminal, a navigation, a kiosk, an MP3 player, a digital camera, a home appliance, a device with camera, or a mobile or non-mobile computing device; however, the present disclosure is not limited thereto.

Figure 2:
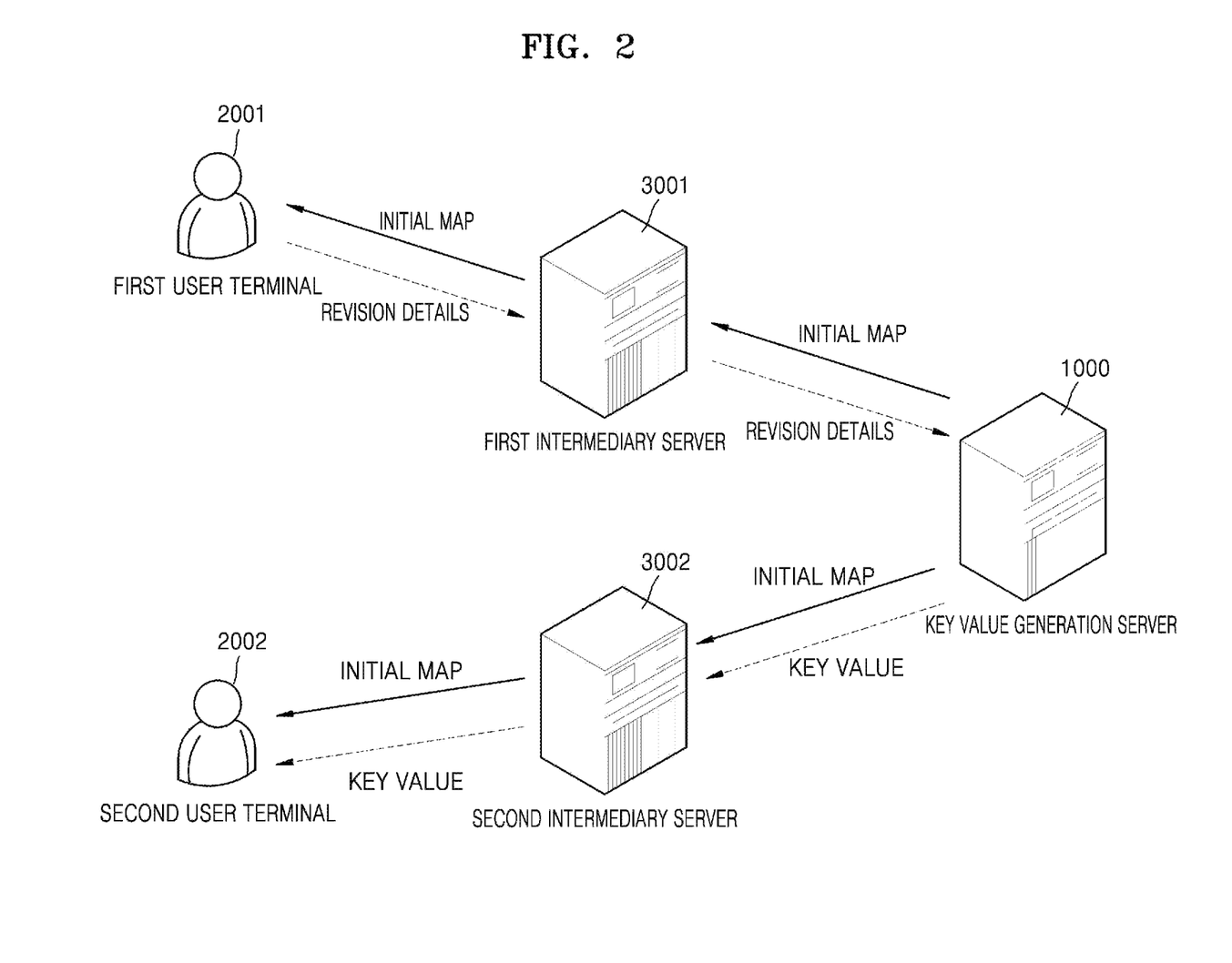
FIG. 2 is a diagram illustrating an example of a method of sharing map revision details according to an embodiment.

Each of the key value generation server 1000 and the intermediary server 3000 may be implemented as a computer device or a plurality of computer devices providing commands, codes, files, contents, services, etc. by communication through a network. FIG. 2 is a diagram illustrating an example of a method of sharing map revision details according to an embodiment.

According to an embodiment, the key value generation server 1000 may receive from the first user terminal revision details generated based on an initial map and a revised map revised from the initial map. The key value generation server 1000 may convert the generated revision details into a key value and transmit the key value to the first intermediary server communicating with the second user terminal. Finally, the key value generation server 1000 may transmit the key value to the second user terminal through the first intermediary server.

Referring to FIG. 2, the first user terminal 2001 and the second user terminal 2002 may receive the initial map from the key value generation server 1000. For example, the first user of the first user terminal 2001 may receive the initial map and generate a revised map revised from the initial map. The first user terminal 2001 may generate revision details based on the initial map and the revised map. For example, the first user terminal 2001 may use a difference algorithm to generate revision details from the initial map and the revised map. The revision details may be generated by using various methods. For example, the revision details may be generated by using an input unit for a unit of user's map revision or a preset time unit. The revision details may be stored and transmitted per each different input unit.

The first user terminal 2001 may transmit the revision details to a first intermediary server 3001. In addition, the first intermediary server 3001 may transmit the revision details to the key value generation server 1000.

The key value generation server 1000 may convert the revision details received from the first intermediary server 3001 into a kay value corresponding to a particular character string and transmit the key value to a second intermediary server 3002. The key value may refer to a value obtained by converting, encompassing, or compressing the revision details made through the first user terminal according to a predetermined rule or method. Although FIG. 2 illustrates that the key value generation server 1000 transmits the key value only to the second intermediary server 3002, the present disclosure is not limited thereto, and the key value may be transmitted to a plurality of other intermediary servers in addition to the second intermediary server 3002.

The second intermediary server 3002 may transmit the key value received from the key value generation server 1000 to the second user terminal 2002 communicating with the second intermediary server 3002. Although FIG. 2 illustrates that the key value generation server 1000 transmits the key value only to the second user terminal 2002, the present disclosure is not limited thereto, and the key value may be transmitted to a plurality of other user terminals communicating with the second intermediary server 3002. Accordingly, the revision details generated by the first user terminal 2001 may be shared with the second user terminal 2002 in real time.

The second user terminal 2002 may also generate the second revision details based on the initial map and the second revised map revised from the initial map. In this case, the first revision details generated by the first user terminal 2001 may be reflected in real time on the second revised map displayed on the second user terminal 2002. Finally, the first revision details may be reflected on the second revised map in real time to generate a second final map. In addition, the second revision details generated by the second user terminal 2002 may be shared with the first user terminal 2001, and the second revision details generated by the second user terminal 2002 may be reflected in real time on the first revised map displayed on the first user terminal 2001. Finally, the second revision details may be reflected on the first revised map in real time to generate a first final map.

Figure 3:
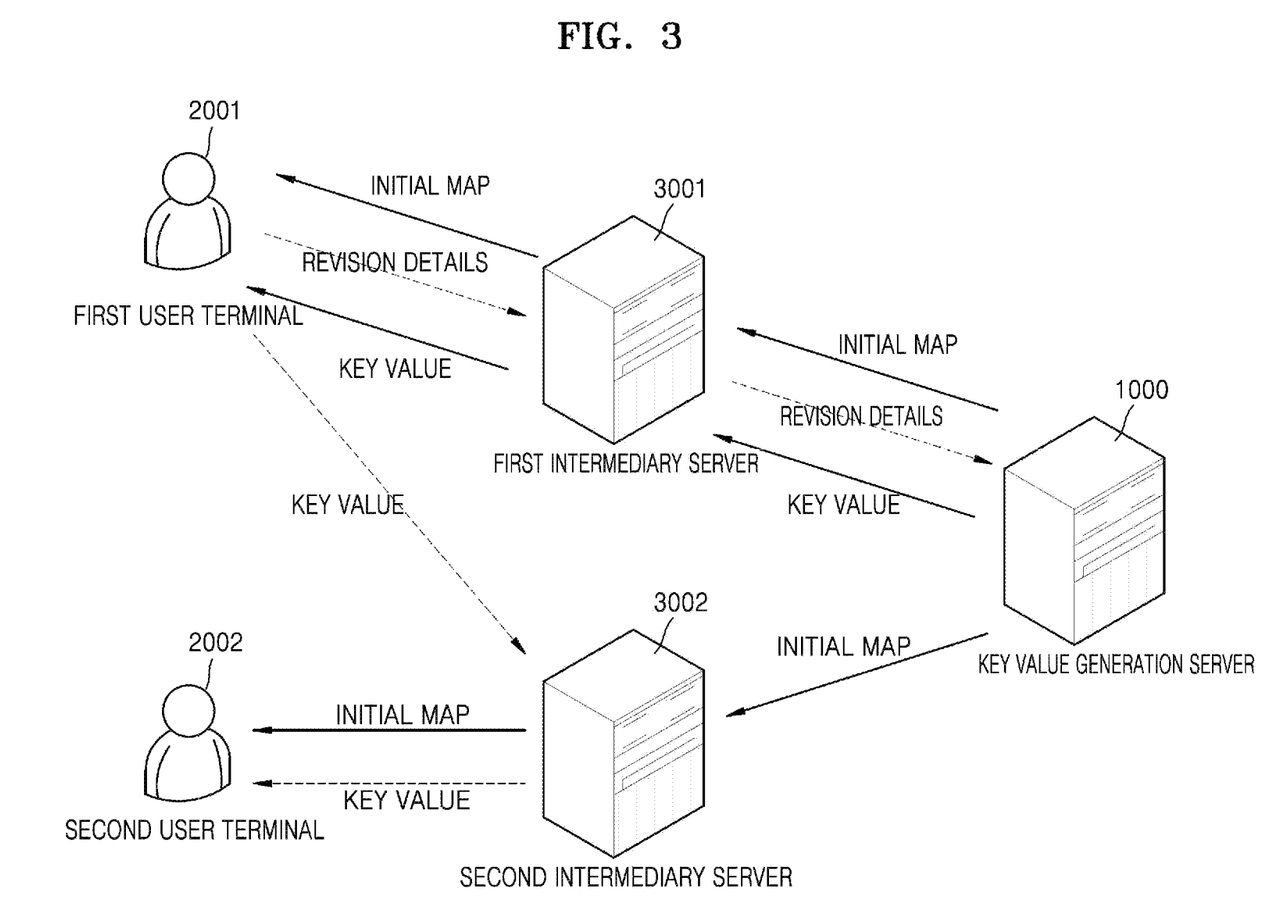
FIG. 3 is a diagram illustrating an example of a method of sharing map revision details according to an embodiment.

FIG. 3 is a diagram illustrating an example of a method of sharing map revision details according to an embodiment.

According to an embodiment, the key value generation server 1000 may receive from the first user terminal revision details generated based on an initial map and a revised map revised from the initial map. The key value generation server 1000 may convert the generated revision details into a key value and transmit the key value to the first user terminal through the first intermediary server communicating with the first user terminal. Then, the key value generation server may transmit the key value to the second user terminal through the second intermediary server which has received the key value from the first user terminal.

Referring to FIG. 3, the first user terminal 2001 and the second user terminal 2002 may receive the initial map from the key value generation server 1000. For example, the first user of the first user terminal 2001 may receive the initial map and generate a revised map revised from the initial map. The first user terminal 2001 may generate revision details based on the initial map and the revised map. For example, the first user terminal 2001 may use a difference algorithm to generate revision details from the initial map and the revised map.

The first user terminal 2001 may transmit the revision details to the first intermediary server 3001. In addition, the first intermediary server 3001 may transmit the revision details to the key value generation server 1000.

The key value generation server 1000 may convert the revision details received from the first intermediary server 3001 into a kay value corresponding to a particular character string and transmit the key value to the first intermediary server 3001 communicating with the first user terminal. For example, the first intermediary server may be a HTTP server, and the key value generation server 1000 may transmit the key value to the first intermediary server in the form of a HTTP response.

The first intermediary server 3001 may transmit the key value received from the key value generation server 1000 to the first user terminal 2001 communicating with the first intermediary server 3001. The first user terminal 2001 may transmit the key value received from the first intermediary server 3001 to the second intermediary server 3002. The first intermediary server 3001 and the second intermediary server 3002 may each be a component included in one server or may each be a separate server.

The second intermediary server 3002 may transmit the key value received from the key value generation server 1000 to the second user terminal 2002 communicating with the second intermediary server 3002. For example, the second intermediary server 3002 may be a streaming server. Although FIG. 2 illustrates that the key value generation server 1000 transmits the key value only to the second user terminal 2002, the present disclosure is not limited thereto, and the key value may be transmitted to a plurality of other user terminals communicating with the second intermediary server 3002. Accordingly, the revision details generated by the first user terminal may be shared with the second user terminal 2002.

The second user terminal 2002 may also generate the second revision details based on the initial map and the second revised map revised from the initial map. In this case, the first revision details generated by the first user terminal 2001 may be reflected in real time on the second revised map displayed on the second user terminal 2002. Finally, the first revision details may be reflected on the second revised map in real time to generate a second final map. In addition, the second revision details generated by the second user terminal 2002 may be shared with the first user terminal 2001, and the second revision details generated by the second user terminal 2002 may be reflected in real time on the first revised map displayed on the first user terminal 2001. Finally, the second revision details may be reflected on the first revised map in real time to generate a first final map.

Figure 4:
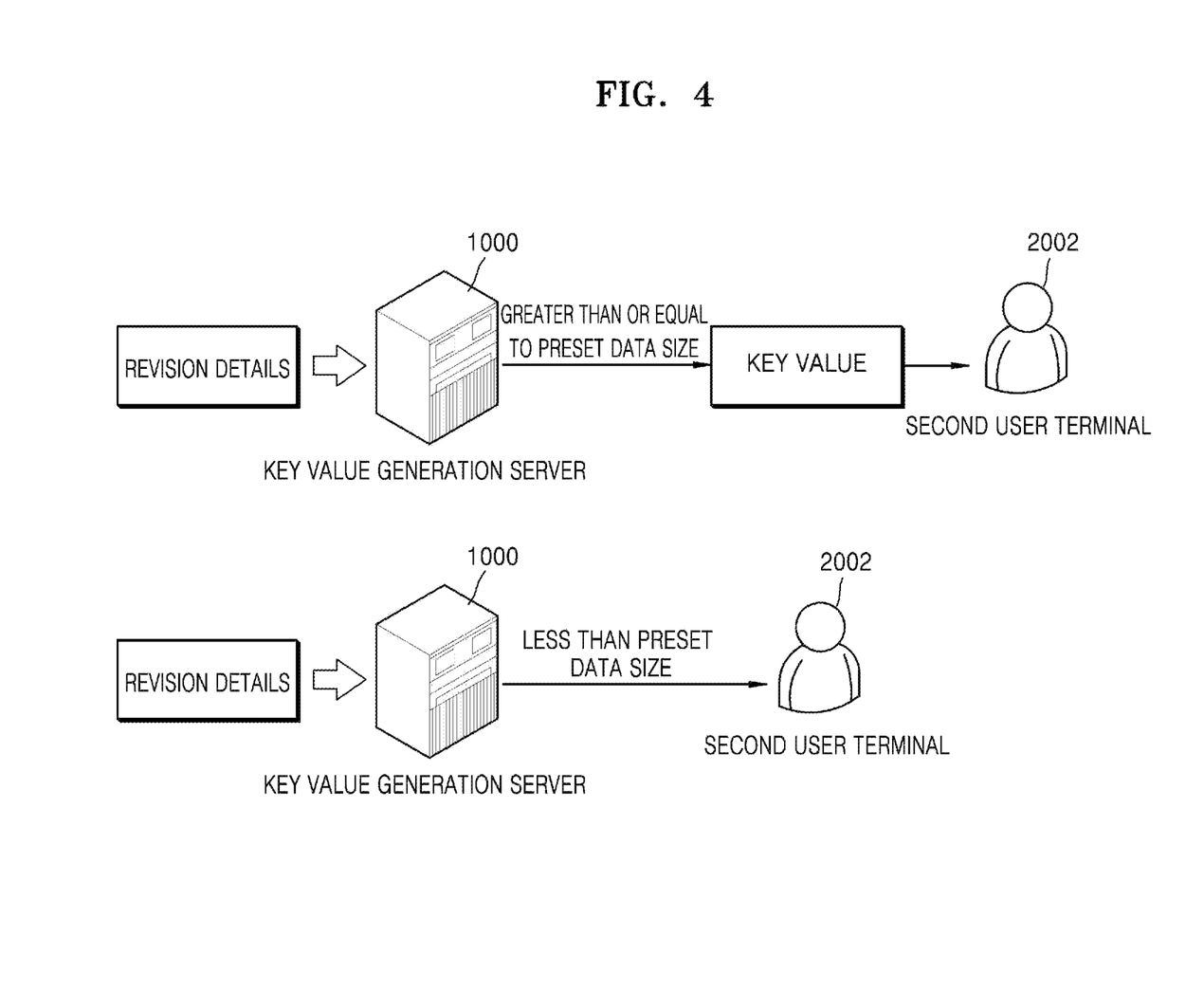
FIG. 4 is a diagram illustrating an example of a method of sharing map revision details according to a size of data including the map revision details according to an embodiment.

FIG. 4 is a diagram illustrating an example of a method of sharing map revision details according to a size of data including the map revision details according to an embodiment.

According to an embodiment, the key value generation server 1000 may determine whether to convert the revision details into a key value and then transmit the key value according to a size of data including the revision details. The embodiment of FIG. 4 may be applied to each of the embodiments of FIGS. 1 to 3.

Referring to FIG. 4, the revision details may be generated from the first user terminal, and the key value generation server 1000 which has received the revision details may compare a size of the revision details with a preset data size.

When the size of the revision details is greater than or equal to the preset data size, the key value generation server 1000 may transmit a key value generated by converting the revision details to the second user terminal 2002. In addition, when the size of the revision details is less than the preset data size, the key value generation server 1000 may not convert the revision details into a key value and transmit the revision details to the second user terminal 2002.

Figure 5:
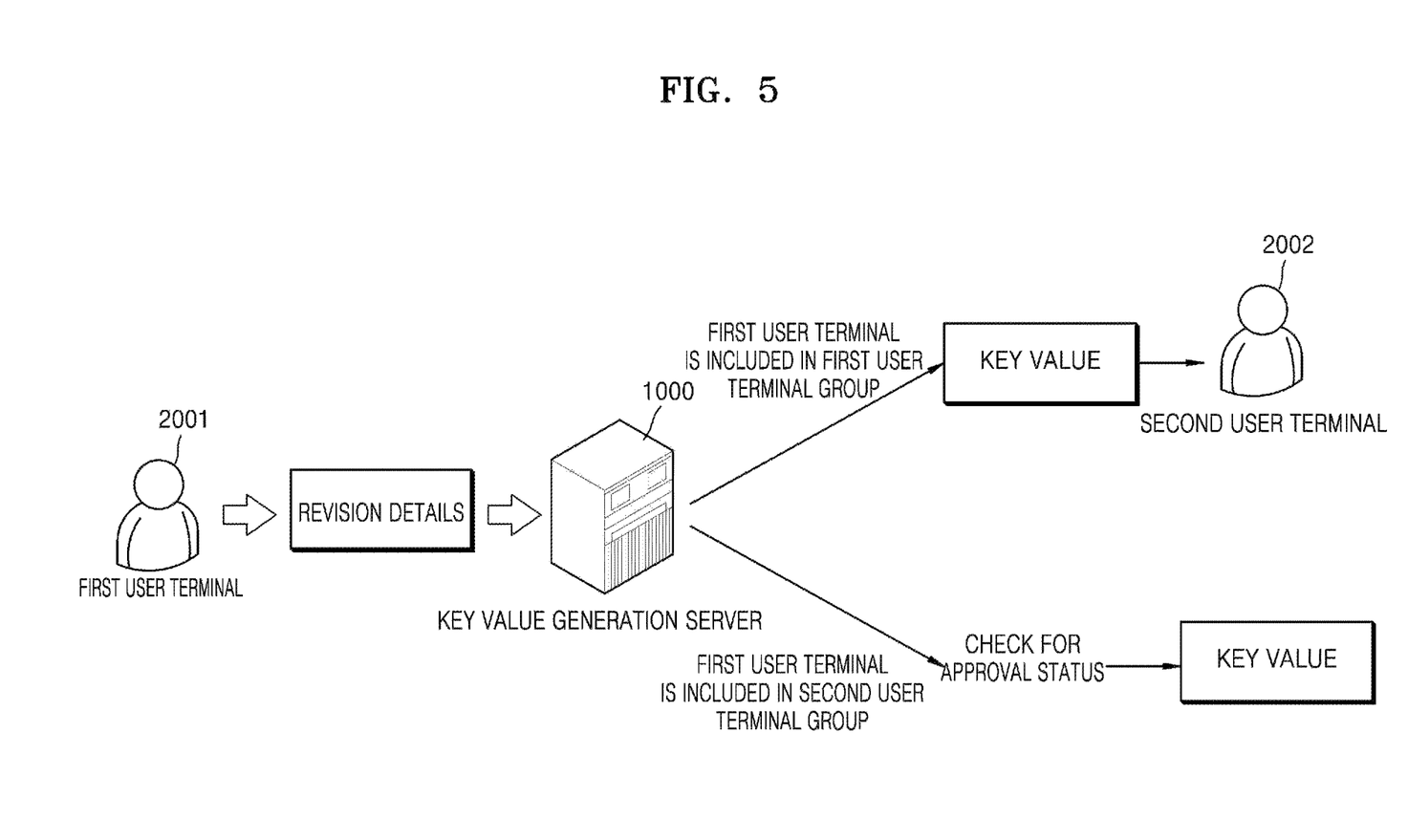
FIG. 5 is a diagram illustrating an example of a method of sharing map revision details according to a group in which a first user terminal is included according to an embodiment.

FIG. 5 is a diagram illustrating an example of a method of sharing map revision details according to a group in which a first user terminal is included according to an embodiment.

According to an embodiment, the key value generation server 1000 may transmit a key value to the second user terminal according to which group between a first user terminal group and a second user terminal group the first user terminal is included in. The embodiment of FIG. 5 may be applied to each of the embodiments of FIGS. 1 to 3.

Referring to FIG. 5, the revision details may be generated from the first user terminal 2001.

First, the key value generation server 1000 may group a plurality of user terminals including the first user terminal 2001 into any one of the first user terminal group and the second user terminal group. Then, the key value generation server 1000 may determine which group between the first user terminal group and the second user terminal group the first user terminal 2001 is included in.

When the first user terminal 2001 is included in the first user terminal group, the key value generation server 1000 may transmit a key value generated by converting the revision details to the second user terminal 2002. When the first user terminal 2001 is included in the second user terminal group, the key value generation server 1000 may check an approval status for a key value generated by converting the revision details and then transmit the key value to the second user terminal 2002. For example, when the first user terminal 2001 is included in the second user terminal group, after the transmission of the key value is approved by a third user terminal authorized to grant approval, the key value may be transmitted to the second user terminal 2002.

Figure 6:
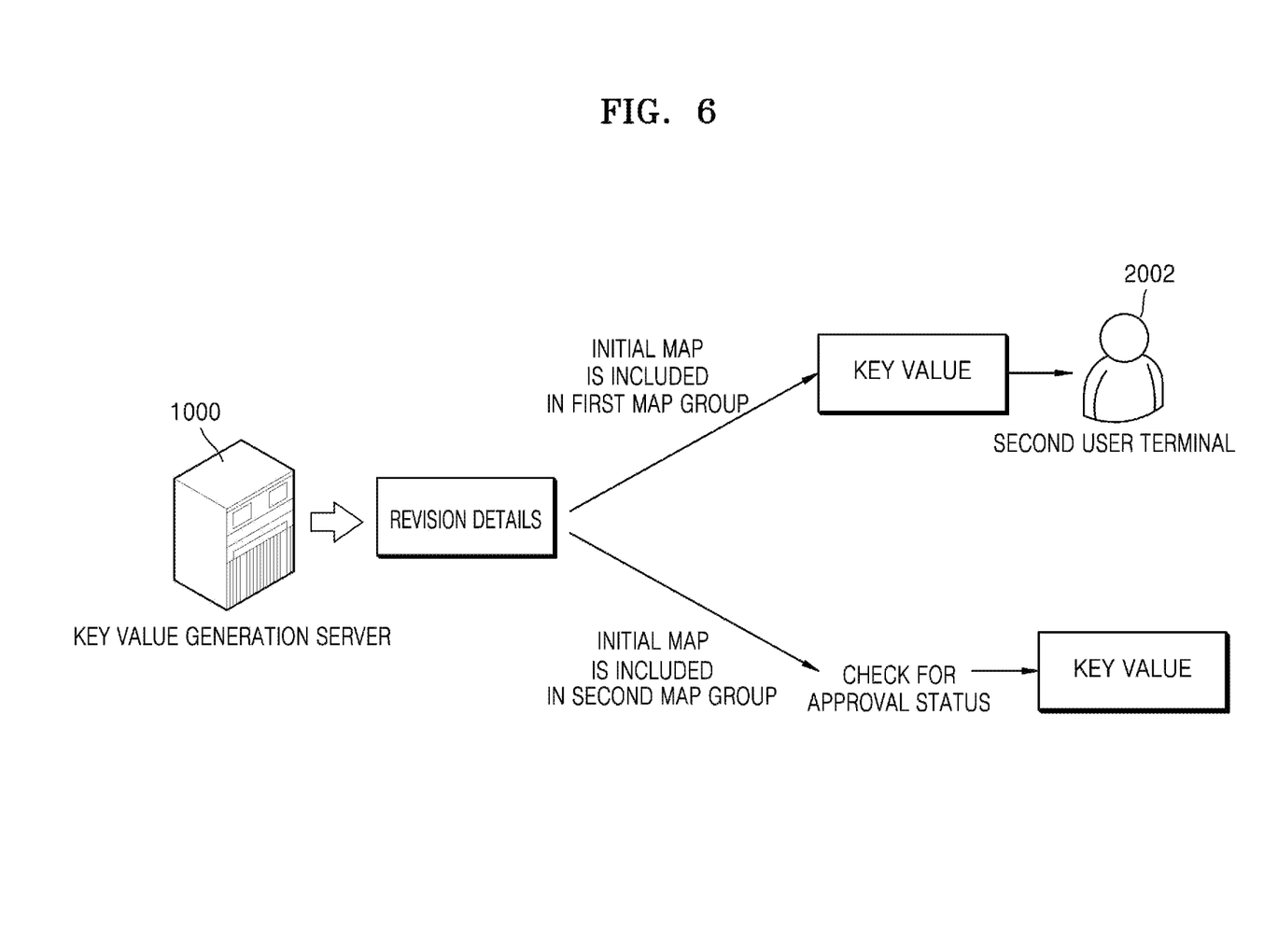
FIG. 6 is a diagram illustrating an example of a method of sharing map revision details according to a group in which an initial map is included according to an embodiment.

FIG. 6 is a diagram illustrating an example of a method of sharing map revision details according to a group in which an initial map is included according to an embodiment.

According to an embodiment, the key value generation server 1000 may transmit a key value to the second user terminal according to which group between a first map group and a second map group the initial map is included in. The embodiment of FIG. 6 may be applied to each of the embodiments of FIGS. 1 to 3.

Referring to FIG. 6, the key value generation server 1000 may group the initial map into any one of the first map group and the second map group according to a type or a data size of the initial map. In addition, the key value generation server 1000 may determine in which group between the first map group and the second map group the initial map is included.

When the initial map is included in the first map group, the key value generation server 1000 may transmit a key value generated by converting the revision details to the second user terminal 2002. When the initial map is included in the second map group, the key value generation server 1000 may check an approval status for the key value generated by converting the revision details and then transmit the key value to the second user terminal 2002. For example, when the initial map is included in the second map group, after the transmission of the key value is approved by a third user terminal authorized to grant approval, the key value may be transmitted to the second user terminal 2002.

The revision details or a key value generated by converting the revision details may include information that may be used to identify a type of the initial map, and the key value generation server 1000 may determine whether to transmit the key value to the second user terminal 2002 based on the information that may be used to identify a type of the initial map.

Figure 7:
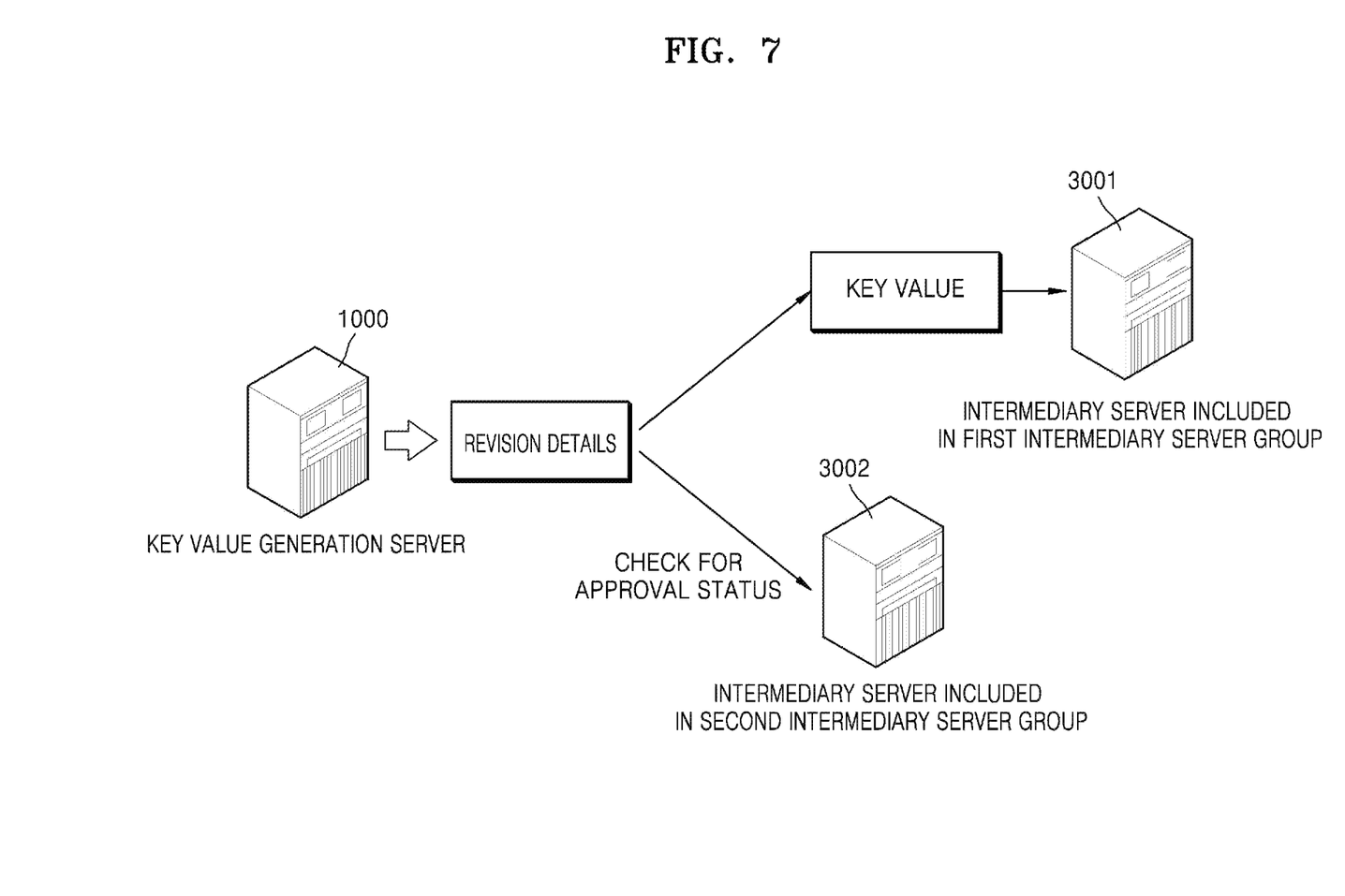
FIG. 7 is a diagram illustrating an example of a method of sharing map revision details according to a group in which an intermediary server is included according to an embodiment.

FIG. 7 is a diagram illustrating an example of a method of sharing map revision details according to a group in which an intermediary server is included according to an embodiment.

According to an embodiment, when transmitting the key value generated by converting the revision details to an intermediary server, the key value generation server 1000 may transmit the key value to the second user terminal through the intermediary server according to which group between a first intermediary server group and a second intermediary server group the intermediary server is included in. The embodiment of FIG. 7 may be applied to each of the embodiments of FIGS. 1 to 3.

Referring to FIG. 7, the key value generation server 1000 may group a plurality of intermediary servers into any one of the first intermediary server group and the second intermediary server group. In addition, the key value generation server 1000 may determine in which group between the first intermediary server group and the second intermediary server group the intermediary server to which the key value converted from the revision details is to be transmitted is included.

When the intermediary server is included in the first intermediary server group, the key value generation server 1000 may transmit the key value generated by converting the revision details to the intermediary server communicating with the second user terminal 2002. When the intermediary server is included in the second intermediary server group, the key value generation server 1000 may not transmit the key value generated by converting the revision details to the intermediary server communicating with the second user terminal 2002.

For example, an intermediary server may be grouped into the first intermediary server group or the second intermediary server group according to whether all of the user terminals communicating with the intermediary server are authorized to receive the key value. When all of the user terminals communicating with the intermediary server are authorized to receive the key value, the intermediary server may be included in the first intermediary server group, and when at least one user terminal among the user terminals communicating with the intermediary server is not authorized to receive the key value, the intermediary server may be included in the second intermediary server group.

For example, when the intermediary server is included in the second intermediary server group, after the transmission of the key value is approved by a third user terminal authorized to grant approval, the key value may be transmitted to the intermediary server.

Figure 8:
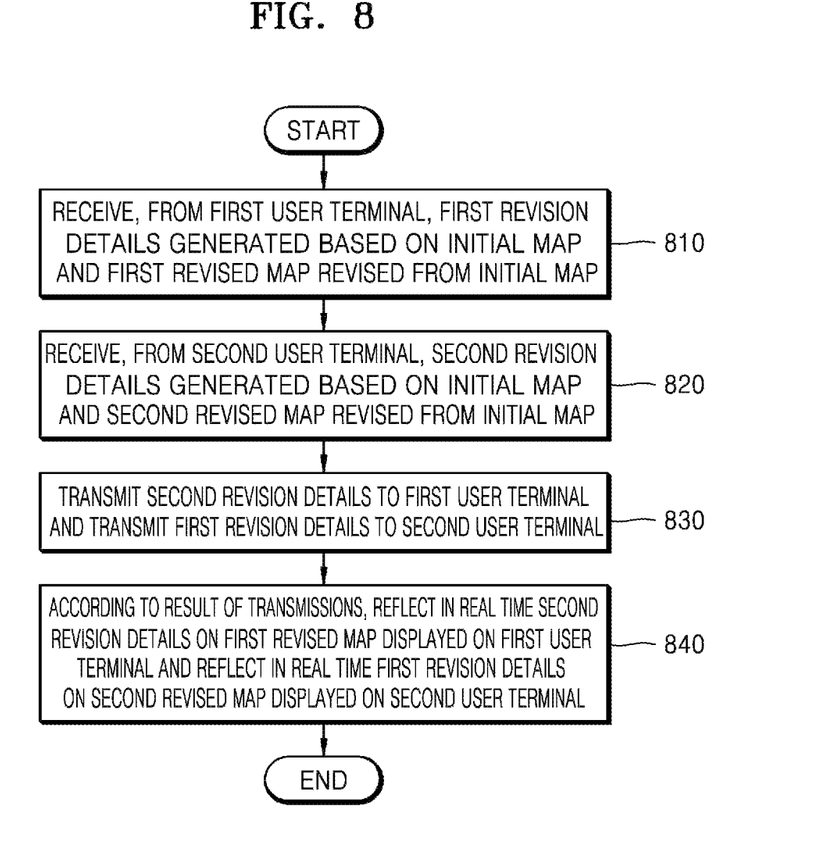
FIG. 8 is a flowchart illustrating a method of sharing map revision details according to an embodiment.

FIG. 8 is a flowchart illustrating a method of sharing map revision details according to an embodiment.

Referring to FIG. 8, in operation 810, the key value generation server 1000 may receive from the first user terminal the first revision details generated based on the initial map and the first revised map revised from the initial map.

In operation 820, the key value generation server 1000 may receive from the second user terminal the second revision details generated based on the initial map and the second revised map revised from the initial map.

In operation 830, the key value generation server 1000 may transmit the second revision details to the first user terminal and transmit the first revision details to the second user terminal.

According to an embodiment, the key value generation server 1000 may convert the first revision details and the second revision details into a first key value and a second key value, respectively, wherein the first and second key values respectively correspond to particular character strings. Then, the key value generation server 1000 may transmit the first key value to the second user terminal and transmit the second key value to the first user terminal.

According to an embodiment, the key value generation server 1000 may transmit the first key value to the second user terminal through the first intermediary server communicating with the second user terminal.

According to an embodiment, the key value generation server 1000 may transmit the first key value to the first user terminal through the first intermediary server communicating with the first user terminal and transmit the first key value to the second user terminal through the second intermediary server which has received the first key value from the first user terminal.

According to an embodiment, the key value generation server 1000 may compare the data size of the first revision details with a preset data size, and based on a result of the comparison, the key value generation server 1000 may transmit the first key value to the second user terminal when the data size of the first revision details is greater than the preset data size.

According to an embodiment, the key value generation server 1000 may group a plurality of user terminals including the first user terminal into any one of the first user terminal group and the second user terminal group and determine whether to transmit the first key value to the second user terminal according to which group between the first user terminal group and the second user terminal group the second user terminal is included in.

According to an embodiment, the key value generation server 1000 may group the initial map into any one of the first map group and the second map group according to a type of the initial map and determine whether to transmit the first key value to the second user terminal according to which group between the first map group and the second map group the initial map is included in.

According to an embodiment, the key value generation server 1000 may group a plurality of intermediary servers including the first intermediary server into any one of the first intermediary server group and the second intermediary server group and determine whether to transmit the first key value to the second user terminal through the first intermediary server according to which group between the first intermediary server group and the second intermediary server group the first intermediary server is included in.

In operation 840, according to a result of the transmission, the key value generation server 1000 may reflect in real time the second revision details on the first revised map displayed on the first user terminal and reflect in real time the first revision details on the second revised map displayed on the second user terminal.

According to an embodiment, a first final map may be generated by reflecting in real time the second revision details on the first revised map displayed on the first user terminal, and a second final map may be generated by reflecting in real time the first revision details on the second revised map displayed on the second user terminal. In addition, the first final map displayed on the first user terminal and the second final map displayed on the second user terminal may be synchronized with each other in real time.

Figure 9:
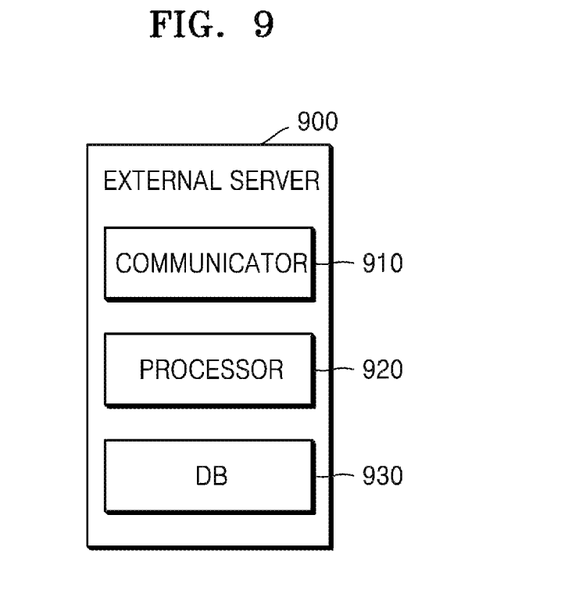
FIG. 9 is a block diagram illustrating a key value generation server according to an embodiment.

FIG. 9 is a block diagram illustrating a key value generation server according to an embodiment.

Referring to FIG. 9, a key value generation server 900 may include a communicator 910, a processor 920, and a DB 930. FIG. 9 illustrates only the components of the key value generation server 900 which are related to an embodiment. It would be obvious to a person skilled in the art that other general-purpose components may be further included in addition to the components illustrated in FIG. 9.

The communicator 910 may include at least one component facilitating wired/wireless communication with an external server or an external device. For example, the communicator 910 may include at least one of a short-range communicator (not shown), a mobile communicator (not shown), and a broadcast receiver (not shown).

The DB 930 may be a hardware storing various data processed in the key value generation server 900 and store a program for processing and control by the processor 920. The DB 930 may store payment information, user information, etc.

The DB 930 may include random access memory (RAM), such as dynamic random access memory (DRAM) and static random access memory (SRAM), read-only memory (ROM), electrically erasable programmable read-only memory (EEPROM), a CD-ROM, a Blu-ray disc, or other optical disc storages, a hard disk drive (HDD), a solid state drive (SSD), or flash memory.

The processor 920 may control overall operations of the key value generation server 900. For example, the processor 920 may control overall operations of an input portion (not shown), a display (not shown), the communicator 910, the DB 930, etc. by executing programs stored in the DB 930. The processor 920 may control operations of a second-best determination device 900 by executing programs stored in the DB 930.

The processor 920 may control at least some of the operations of the key value generation servers described in relation to FIGS. 1 to 8.

The processor 920 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electrical units for performing functions.

The embodiments according to the present disclosure described above may be implemented in the form of a computer program which can be executed in a computer through various components, and such computer program may be recorded on a computer-readable medium. In this regard, the medium may include a magnetic medium, such as a hard disk, a floppy disk, and a magnetic tape, an optical recording medium, such as a CD-ROM and a DVD, a magneto-optical medium, such as a floptical disk, a hardware device specifically configured to store and execute program instructions, such as ROM, RAM, flash memory, etc.

Meanwhile, the computer program may be specifically designed and configured for the present disclosure, or may be publicly known to those skilled in the art of computer software. Not only machine language codes generated by a compiler, etc., but high level language codes which can be executed by a computer by using interpreters, etc. are also included in examples of the computer program.

According to an embodiment, a method according to various embodiments of the present disclosure may be included and provided in a computer program product. The computer program product may be traded between a seller and a buyer as a commodity. The computer program may be distributed in the form of a storage medium readable by a device (e.g., compact disc read only memory (CD-ROM) or distributed online (e.g., downloaded or uploaded) directly between two user devices or through an application store (e.g., Playstore™). In the case of online distribution, at least a part of the computer program may be at least temporarily stored or generated in a device-readable storage medium, such as a server of a manufacturer, a server of an application store, or a memory of an intermediary server.

Also, the steps of all methods described herein can be performed in any suitable order unless otherwise indicated herein or otherwise clearly contradicted by context. Embodiments are not limited to the described order of the steps. The use of any and all examples, or exemplary language (e.g., "such as") provided herein, is intended merely to better illuminate embodiments and does not pose a limitation on the scope of embodiments unless otherwise claimed. Numerous modifications, combinations, and adaptations will be readily apparent to one of ordinary skill in the art without departing from the spirit and scope of present disclosure.

Accordingly, the technical ideas of the present disclosure are not limited to the embodiments described above, and it is to be appreciated that all changes, equivalents, and substitutes that do not depart from the scope of the claims below are encompassed in the present disclosure.

The invention claimed is:

1. A method of sharing map revision details, the method comprising:
 receiving, from a first user terminal, first revision details generated based on an initial map and a first revised map revised from the initial map;
 receiving, from a second user terminal, second revision details generated based on the initial map and a second revised map revised from the initial map;
 transmitting the second revision details to the first user terminal and transmitting the first revision details to the second user terminal; and
 according to a result of the transmissions, reflecting in real time the second revision details on the first revised map displayed on the first user terminal and reflecting in real time the first revision details on the second revised map displayed on the second user terminal,
 wherein the transmitting the first revision details and the second revision details comprises:
 converting the first revision details and the second revision details into a first key value and a second key value, respectively, wherein the first and second key values respectively correspond to particular character strings; and
 transmitting the first key value to the second user terminal and transmitting the second key value to the first user terminal,
 wherein the transmitting the first key value and the second key value comprises:
 grouping the initial map into any one of map groups according to a type of the initial map; and
 determining whether to transmit the first key value to the second user terminal according to map group the initial map is included in.

2. The method of claim 1, wherein a first final map is generated by reflecting in real time the second revision details on the first revised map displayed on the first user terminal,
 a second final map is generated by reflecting in real time the first revision details on the second revised map displayed on the second user terminal, and
 the first final map displayed on the first user terminal and the second final map displayed on the second user terminal are synchronized with each other in real time.

3. The method of claim 1, wherein the transmitting further comprises transmitting the first key value to the second user terminal through a first intermediary server communicating with the second user terminal.

4. The method of claim 3, wherein the transmitting further comprises:
 grouping a plurality of intermediary servers including the first intermediary server into any one of a first intermediary server group and a second intermediary server group; and
 determining whether to transmit the first key value to the second user terminal through the first intermediary server according to which group between the first intermediary server group and the second intermediary server group the first intermediary server is included in.

5. The method of claim 1, wherein the transmitting further comprises:
 transmitting the first key value to the first user terminal through a first intermediary server communicating with the first user terminal; and
 transmitting the first key value to the second user terminal through a second intermediary server which has received the first key value from the first user terminal.

6. The method of claim 1, wherein the transmitting further comprises:
 comparing a data size of the first revision details with a preset data size; and
 based on a result of the comparison, transmitting the first key value to the second user terminal when the data size of the first revision details is greater than the preset data size.

7. The method of claim 1, wherein the transmitting further comprises:
 grouping a plurality of user terminals including the first user terminal into any one of a first user terminal group and a second user terminal group; and
 determining whether to transmit the first key value to the second user terminal according to which group between the first user terminal group and the second user terminal group the second user terminal is included in.

8. An apparatus configured to share map revision details, the apparatus comprising:
 a memory storing at least one program; and
 at least one processor configured to share the revision details by executing the at least one program,
 wherein the at least one processor is further configured to:
 receive, from a first user terminal, first revision details generated based on an initial map and a first revised map revised from the initial map;
 receive, from a second user terminal, second revision details generated based on the initial map and a second revised map revised from the initial map;
 transmit the second revision details to the first user terminal and transmit the first revision details to the second user terminal; and
 according to a result of the transmissions, reflect in real time the second revision details on the first revised map displayed on the first user terminal and reflect in real time the first revision details on the second revised map displayed on the second user terminal;
 wherein the transmitting the first revision details and the second revision details comprises:
 convert the first revision details and the second revision details into a first key value and a second key value, respectively, wherein the first and second key values respectively correspond to particular character strings; and
 transmit the first key value to the second user terminal and transmitting the second key value to the first user terminal,
 wherein the transmitting the first key value and the second key value comprises:
 group the initial map into any one of map groups according to a type of the initial map; and
 determine whether to transmit the first key value to the second user terminal according to map group the initial map is included in.

* * * * *